Feb. 8, 1966  M. W. COUTTS  3,234,026
PROCESS FOR THE MANUFACTURE OF BEER, ALE AND THE LIKE
Original Filed Aug. 5, 1957  2 Sheets-Sheet 1
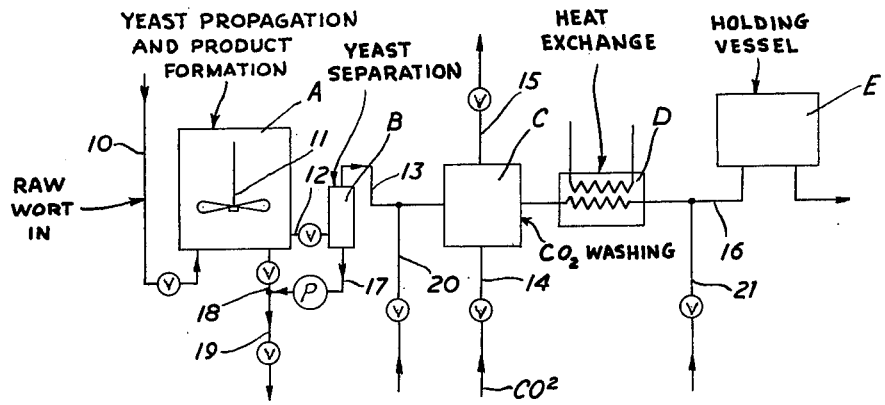
FIG. 1
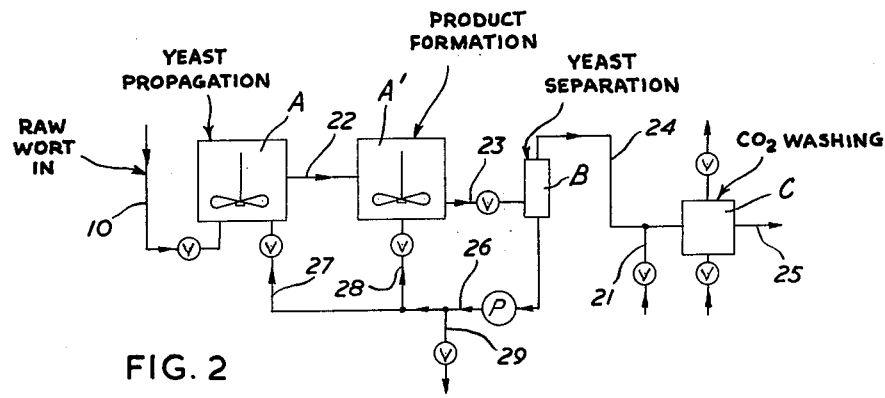
FIG. 2
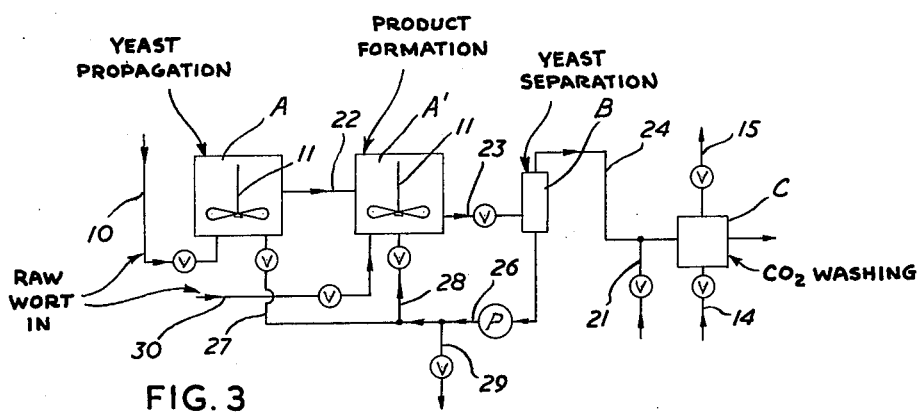
FIG. 3
Inventor
MORTON W. COUTTS
By 
Attorney Inventor
MORTON W. COUTTS By *[signature]*

Attorney

United States Patent Office 3,234,026
Patented Feb. 8, 1966

3,234,026
PROCESS FOR THE MANUFACTURE OF BEER, ALE AND THE LIKE
Morton William Coutts, Bairds Road, Otahuhu, Auckland, New Zealand
Continuation of abandoned application Ser. No. 676,187, Aug. 5, 1957. This application Sept. 1, 1960, Ser. No. 53,495
Claims priority, application New Zealand, Aug. 6, 1956, 117,047; Aug. 17, 1956, 117,136; Jan. 29, 1957, 118,139; Feb. 22, 1957, 118,274; Mar. 22, 1957, 118,464
31 Claims. (Cl. 99—31)

This invention relates to a continuous method for the fermentation of brewery wort for the production of a portable non-distilled alcoholic beverage product. This application is a continuation of my application Serial No. 676,187, filed August 5, 1957.

A major object of the invention is the provision of an improved process for the production of such products which will enable the production thereof with greatly decreased fermenting time than is possible by present processes and which will give better control of flavour at greatly decreased cost of manufacture.

The process will be described conveniently with relation to the production of beer but it will be understood that it is not confined thereto and applies to all other non-distilled malt beverages.

According to known processes, beer is fermented from its original to its desired final gravity by a gradual lowering of the specific gravity of the wort over a period of time extending from six to fourteen days and then it is matured for a further two to fifteen weeks. In this normal process, relatively low fermentation temperatures are employed. The fermentation starts out at a lower temperature than the final and gradually builds up to a final temperature because of the heat generated by the fermenting yeast. The temperatures between the original and the final are controlled by means of attemporation. Th final peak temperature is maintained at a point below that theoretically possible. This restriction of the fermentation slows down the gravity drop and increases the time period required to decrease the gravity from the original to the final. The yeast is separated from the beer either by gradual sedimentation in the case of lager or by skimming from the surface in the case of ale. Both processes require time and labour. In the same way the original yeast population is kept low and gradually increases as fermentation proceeds. By contrast, the present process will permit the completion of fermenting in eighteen hours or less.

The present process, devised particularly to shorten the periods of time, also attains other desirable advantages not previously possible such as controlled flavour as required, rapid fermentation in one or more stages, complete control of yeast concentration used for fermenting, complete control of fermentation gravity, considerable economy in labour required compared with existing processes, considerable economy in capital required for process equipment, considerable economy in refrigeration required compared with previous and existing processes, production of finished beer in a fraction of the time required by known processes, continuous blending during maturing, elimination of pitching yeast storage, substantially oxygen free conditions throughout the process, complete control of yeast propagation and processing losses, fermentation and maturing possible at any temperature from 38° F. up to the thermal death point of the fermenting yeast used (recognized as between 110° and 120° F.), fermentation at a constant optimum pH value.

In particular, the preferred process broadly is based on the principle of continuous feeding of yeast with wort, the employment of a relatively high yeast population level, the employment preferably of a relatively high fermentation temperature, continuous agitation, combined with the continuous or substantially continuous addition of unfermented wort to the fermenting vessel or vessels at a predetermined rate and similar withdrawal of the fermented liquid at a corresponding rate. By high temperature, I mean temperatures above 48° F., and theoretically up to the thermal death point of the yeast. Preferably, temperatures of 60° F. up to 80° F. or higher are employed.

By providing for use of higher temperatures and greater yeast concentrations than are normal for the batch fermentation of beer, along with continuous agitation, accelerated fermentation in one or more stages is made possible. By greater yeast concentrations, I means concentrations above 12 grams per litre and which can be as high as 100 grams per litre of fermenting wort.

Accelerated fermentation and maturing at high temperatures are achieved without danger of autolysis of the yeast in suspension because the continuously added wort keeps all yeast in suspension in the maturing beer in an active fermenting state, thus maintaining enzymatic activity for the maturing process and preventing the yeast using up its own reserve of food stored within itself. In normal beer fermentations all yeast reaches a state of starvation and in this condition rapidly autolyse and the autolysates impart undesirable flavours to the finished beer. However, the yeast concentration can be up to 100 grams of yeast with a moisture content of 80%, in each litre of beer fermenting. The amount normally present in the orthodox batch system is about 12 grams per litre at the peak of fermentation.

The invention accordingly generally embodies a method for the continuous fermentation of brewery wort for the production of a potable, non-distilled alcoholic malt beverage product characterized by passing said wort through a system of interconnected zones, continuously introducing wort to the first zone of said system and promoting rapid fermentation thereof by maintaining a yeast concentration in said wort above 12 grams per litre, maintaining said wort at a temperature above 48° F., maintaining said yeast in suspension in said fermenting wort by continuous agitation whereby to promote such rapid fermentation, thereafter separating yeast therefrom and continuously drawing off the substantially clarified fermented wort from said system at the same rate as the rate of introduction of the wort to the first of said zones. When insufficient yeast is being propagated to maintain desired concentration the invention contemplates re-using a portion of the separated yeast in the system for this purpose. Among other variations it also contemplates the return of yeasty fermented beer to the incoming wort for preconditioning the wort. When desired a wort up to six times the specific gravity of that desired for making the finished beer may be prepared in the brewhouse and treated as hereinafter described. It would be diluted at various stages of the fermentation with up to six parts of water to each part of strong wort processed in a two or more vessel system.

The invention will be more clearly illustrated by reference to the following detailed specification taken in conjunction with the accompanying drawings.

In the drawings:

FIG. 1 is a diagrammatic illustration of apparatus arranged in a system for the continuous fermentation of brewery wort for the production of potable, non-distilled, alcoholic malt beverages according to the present invention.

FIG. 2 shows a form of apparatus in which the fermentation vessels, which can be up to three or four in number are connected in series to enable the flow to be completely continuous, and in which the agitation, yeast in suspension and the temperature can be controlled separately.

FIG. 3 is a diagrammatic illustration of a further arrangement of apparatus in a system according to the present invention employing a plurality of fermenting vessels.

Figure 5:
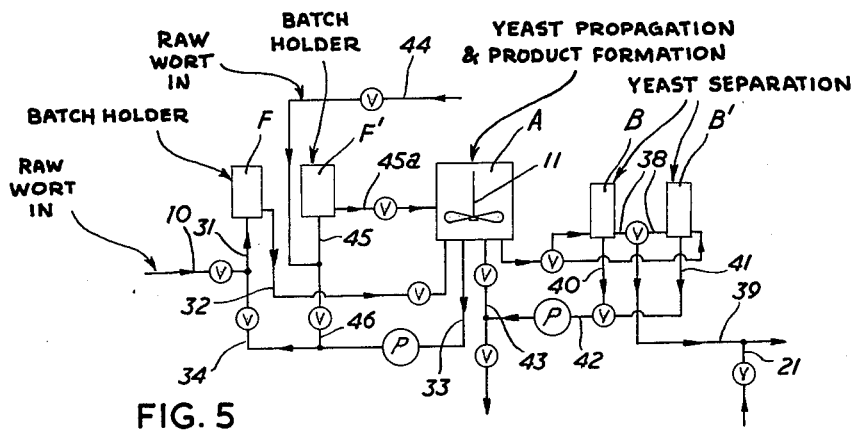
Figure 6:
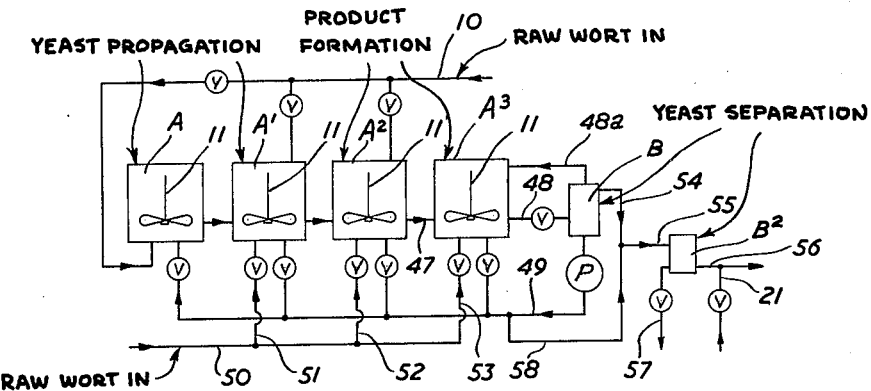

FIG. 5 is a further alternative diagrammatic illustration enabling both malt and sugary materials to be fermented separately so that any desired combination of material can be left in the residual gravity of the finished product; and FIG. 6 is a diagrammatic illustration of the system employing four fermenting vessels in series in which the various extract materials can be fermented to give any desired flavour.

Referring to the drawings, the system is generally illustrated by series connected treatment zones wherein wort is continuously introduced to the first zone and passed through the remaining zones employed in the system during which it is rapidly fermented under conditions of high yeast concentration, controlled high temperatures and agitation and wherein the yeast is separated from the fermented wort which is then finally drawn off through the system at the same rate as the rate of introduction of the wort, and any diluting water and flavoring material added to the system.

Referring to FIG. 1 which illustrates one system of interconnected zones, generally represented by the vessels A to E inclusive, wort is continuously introduced to the fermenting vessel A via the line 10 connected to a wort holding vessel (not shown), introduction being effected under suitable valve control to vessel A at a predetermined rate. The yeast is maintained in vessel A at a predetermined high concentration; the temperature is maintained at a high level, by any wall known means of control; and the wort is subjected to agitation by means of a suitable agitator 11, all of these factors combining to promote rapid yeast propagation and fermentation, and the fermented liquid is withdrawn from vessel A by line 12, suitably valve controlled, at the same rate as the rate of wort introduction, and introduced to the continuous yeast separating vessel B. Here the yeast is separated from the fermented liquid where the yeast quickly flocculates and settles out to the bottom of the vessel. The substantially clarified liquid is then passed via line 13 to $CO_2$ washing vessel C, if desired, and wherein $CO_2$ gas is introduced by way of the line 14 and discharged by way of the line 15, the $CO_2$ gas having the effect of eliminating undesirable volatiles and passing them to atmosphere. The thus clarified fermented liquid may then be passed by pipe line to heat exchanger D to reduce temperature, where this may be desired, and then passes by line 16 to the holding vessel E where the liquid may be held for a predetermined time and withdrawn for storage and finishing.

The temperature of the wort in vessel A is maintained at a desired fermenting temperature by suitable means (not shown) and which for rapid fermentation is above 48° F. but preferably is 60° F. and above, and may theoretically be up to the thermal death point of the yeast. The agitator 11 maintains substantial homogeneity of the contents and the required degree of specific gravity in the finished beer is obtained by adjusting the incoming flow of wort so that its fermentable material replaces the material fermented in the liquid in this vessel which results in the desired specific gravity being maintained. As indicated, the fermented wort is withdrawn through pipe 12 at a predetermined rate which is the same as that of the wort addition to vessel A. This rate will depend on the conditions existing and will be increased by higher temperatures, greater yeast concentration, and more intense agitation, or combinations of these factors. With low yeast concentration and lower temperatures and gentle agitation, it would amount to about one-sixtieth of the contents of the vessel per hour when fermenting 30° of specific gravity from a 1.036 S.G. wort, while with intense agitation and high temperature such as 80° F. and yeast concentrations of 70 grams per litre fermenting wort the throughput of wort with a gravity drop of 30° specific gravity could be as high as one-tenth the total contents of the vessel per hour. These conditions may be adjusted to the desired flavour required in the beer being made.

The amount of yeast being produced may be controlled by the rate of agitation, concentrations of yeast and temperature. Higher temperatures and higher agitation increases yeast propagation while higher yeast concentrations decrease yeast propagation. An adjustment so that about 5 grams of yeast per litre of wort is propagated, will make a fuller, sweeter beer, while adjustments bringing about high yeast propagation say around about 15 grams per litre, will make a dry, more bitter beer. These yeast concentrations are based on an incoming wort gravity of 1.027 degrees specific gravity of malt extract. When the malt extract is of higher concentrations the yeast propagation mentioned should be increased to get the same flavour. The outgoing beer from pipe 12 runs continuously into yeast separating vessel B where the yeast quickly flocculates and settles to the bottom of the vessel. The settled yeast runs through pipe 17 via a pump to pipe 18 through pipe 19 to surplus yeast tanks (not shown). If desired a part may be diverted and returned to the fermenting and maturing vessel A to maintain the yeast concentration. The yeast separating vessel may be arranged so that a controlled amount of the settled yeast flows back to vessel A by gravity. The yeast separating vessel B may be substituted by a centrifugal clarifier of known means. If desired lines 20 and 21 may be connected in the system for the addition of additives such as finings or adsorbant material for clarification where this may be desired.

The $CO_2$ washing vessel when employed is as previously indicated supplied with $CO_2$ through pipe 14 which may communicate with an internally located perforated pipe or other diffusing equipment, such as Ceramic Candles, which allows a continuous flow of fine $CO_2$ bubbles to rise through the contents of the vessel. Vessel C is preferably provided with a flow control venting valve in the line 15 which maintains a constant level of beer in vessel C and at the same time allows excess $CO_2$ to escape. Vessel C is designed to have a beer capacity at the control level equal to about 16 times the hourly flow of wort supplied to the system through pipe line 10.

Where it is desired to reduce the temperature of the beer, the heat exchanger D is employed while finings or adsorbant material for clarification purposes may be injected into the beer by means of pipe 20 and/or pipe 21. A plurality of holding vessels, such as vessel E, may be employed and the beer will remain in them for a predetermined period when it is discharged for final clarification, carbonation and bottling or kegging.

A modified process shown in FIGURE 2 is a similar process to that described in FIGURE 1 except that a further vessel A1 which is similar in all respects to vessel A is placed in series between vessel A and separating vessel B, and the wort is fermented progressively in these two vessels A and A1, each vessel being maintained at its own individual temperature, degree of agitation and yeast in suspension. It is an advantage to run vessel A so that substantially the total required amount of yeast production is obtained in this vessel and the vessel A1 adjusted so that practically no yeast production occurs and that approximately one-fifth of the carbohydrate is converted to alcohol and $CO_2$. In order to produce substantially all the yeast in the first vessel a higher rate of turbulence will be maintained so that the yeast will rapidly assimilate substantially all the oxygen in the incoming wort, therefore substantially oxygen free conditions will prevail in vessel A and therefore throughout the system, and the second vessel will be run at a low degree of turbulence. If desired three or four vessels can be used, all being operated in series. The wort is introduced to vessel A in a similar manner to FIG. 1 via line 10 and passed by line 22 to the second fermenting vessel A1 where any residual matter is fermented out. The fermented liquid is then passed by line 23 to the continuous yeast separating vessel B, from which it is passed by the pipe line 24 to a $CO_2$ washing vessel C, and from this by line 25 to other vessels which may be employed, such as illustrated in FIG. 1, and thence to storage and finishing.

In the arrangement of FIG. 2, yeast from the separating vessel B may be pumped by the line 26 to either one or both of the fermenting vessels A and A1 by the valve controlled pipe inlets 27 and 28, when all excess yeast is not discharged through the valve controlled discharge line 29.

A similar combination of zones is shown in FIG. 3 to that of FIG. 2 with the exception that from a second wort storage tank, wort may be introduced to the second fermenting vessel A1 by means of the line 30 so that the wort may be fermented in the system in two separate parts where this may be desired. The wort being fermented in vessel A may be characterised by a strong hop flavour and malt extract, while the sugary portion of the wort derived from the adjuncts and containing the choice delicately flavoured hops are added to vessel 1. The amount of carbohydrate material required to give the desired flavour is fermented in vessel A and is then run to vessel A1 where the adjunct portion of the wort is added and from there is treated in a similar manner as that described in connection with FIG. 2. Under normal working conditions, the proportion of malt wort to sugary wort will be in approximately the ratio of 3 to 1 and approximately 75% of the total flow will, therefore, pass through pipe line 22 and the remaining 25% through line 30, the total flow passing from the outlet of vessel A1 to the continuous yeast separator B. This system allows a part of the sweet delicate portion of the extract to be retained in the finished beer and which would otherwise be lost during a normal batch fermentation.

The returned yeast in this modification is conveyed separately to each of the vessels A and A1 but generally vessel A1 should be maintained at a high concentration of yeast of about 40 grams per litre.

Figure 4:
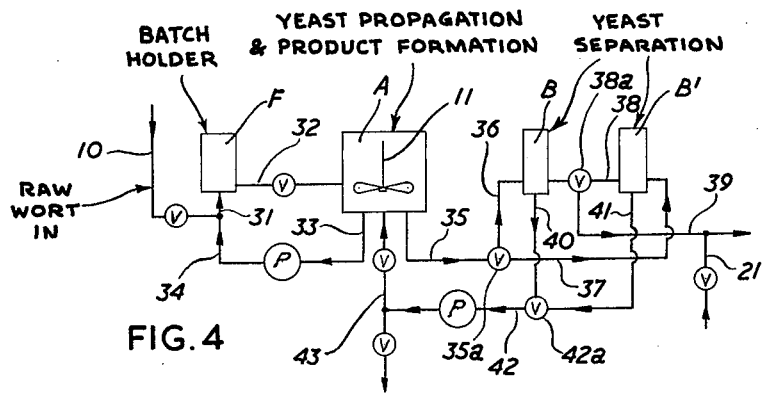
FIG. 4 is a diagrammatic illustration similar to FIG. 1 showing a method where the flow is intermittent between zones.

In the alternative system shown in FIG. 4, operation is similar to that described for the system of FIG. 1 except that instead of the wort running continuously through the system it is fed continuously by way of pipe line 10 through pipe 31 to a batch holding vessel F and is fed intermittently from vessel F by way of valve controlled line 32 to the fermenting vessel A. The batch holding vessel F, may be yeasted with yeasty beer from the fermenting vessel A by means of the pipe line 33 by pump through line 34 which connects with pipe line 31. The fermented liquid from vessel A is likewise intermittently fed to the yeast separating vessel B by way of valve controlled line 35 and line 36. Each batch of wort from vessel F is added to vessel A in about one-twentieth of the time required for the batch to accumulate in holding vessel F. The valve in line 32 can be controlled so that small amounts at short intervals or large amounts at long intervals are caused to flow from vessel F to vessel A, as desired, but always at an average flow set by the flow control valve in line 10 and the circulating pump in line 33. The batch additions to vessel A would be an amount equal to between one and nine hours flow through pipe 10 into vessel F according to the flavour desired in the finished beer. Fermenting beer is continually circulated from vessel A by pump through line 33 to the flow of wort in pipe line 10 at a flow rate equal to about one-fifth of the wort flow, and thereby reducing the pH of the incoming wort. A vigorous propagation of yeast will take place in vessel F and this propagation should be aided by the introduction of air to the content of vessel F if it is found that the desired amount of yeast is not being propagated. Stirring, heating and cooling means are adjusted to give the required amount of yeast propagation in vessel F. The conditions in the fermenting vessel A are maintained according to the flavour desired as described in the process under FIG. 1. Near the end of the batch cycle according to the flavour of the beer required, a batch of beer equal to that previously added to vessel A but less the amount removed from vessel A by pump in line 33 is caused to flow alternatively to yeast settling vessels B and B1 by a suitably operating change-over valve 35a in line 35.

The change-over valve 35a connects with line 37 leading to the yeast settling vessel B1 which is interconnected with yeast separating vessel B by means of valve controlled line 38, which valve in turn is connected to discharge line 39 through which the beer is passed through other zones, as may be required and referred to in previous figures. The change-over valve 35a is interlocked with the valve 38a in line 38 in such a manner that whilst one yeast settling vessel is on a filling cycle, the flow rate being the same as that in valve controlled line 32 less that being removed by the pump through line 33, the other yeast settling vessel is on an emptying cycle, the flow rate being the same as through the control valve in line 10. Also interlocked with the change-over valve 35a is a change-over valve 42a in line 42, which connects with the lines 40 and 41 leading from yeast settling vessels B and B1, the interlocking being so arranged that yeast is taken through the valve in line 42 from the same vessel as beer is being taken from the valve 38a. From the change-over valve 42a, yeast flows through this line 42 through to the inlet of the pump there and through to pipe line 43 where controlled amounts are passed into the fermenting vessel A as required to maintain the desired yeast concentration in vessel A while surplus yeast is discharged in the opposite direction through line 43 to excess yeast collection.

In the alternative system shown in FIG. 5, an intermittent system is disclosed similar to that shown in FIG. 4 with the exception that in the case of FIG. 5, the wort from the malt and the wort from the adjunct are prepared separately in the brewhouse, the adjunct wort containing the delicately flavoured hop material being added by way of the batch holding vessel F. Thus, the system is similar to that of FIG. 4 except that a second similar vessel F1 is included in the system fed from a separate wort holding vessel by way of the valve controlled line 44 which connects with pipe line 45 communicating with holding vessel F1 and from which yeasty wort is continuously fed as required by pipe line 45a to the fermenting vessel A, the yeasty beer, being fed to vessels F and F1, as desired, by connecting through line 33 by valve controlled pipe line 46 and its extension 45, and valve controlled line 34 and its extension 31. Thus, wort of two different kinds is fed to the fermenting vessel A from vessels F and F1. The malt wort portion is added intermittently to fermenting vessel A in a similar way to that described in FIG. 4. The surgary solution together with the delicate hop extracts flow into vessel F continuously but likewise to added to vessel A intermittently. The proportion of sugary wort to malt wort is usually in the ratio of one sugary to three malt but this ratio can be varied if desired. The sweetness of the finished beer may be varied by varying the time of addition of adjunct wort from vessel F1 to vessel A. Otherwise, as indicated, the system is similar to that shown in FIG. 4.

In the system shown in FIG. 6, the malt wort and the sugary wort described in connection with FIG. 3 are prepared in the brewhouse and may be introduced separately into a plurality of fermenting vessels, a series of four being illustrated. Wort of one kind is passed from the wort storage vessel by pipe line 10 and may be fed to each of the three fermenting vessels A, A1 and A2, either separately or in series, passing from one to the other by the interconnecting lines shown, and finally passed by pipe line 47 to the fermenting vessel A3. This, of course, illustrates a system employing four fermenting vessels, it being understood of course from the foregoing that more or less may be used as desired. From fermenting vessel A3, the fermented beer is passed by way of pipe line 48 to the yeast separating vessel B from which the yeast may be pumped via line 49 and introduced to any of the fermenting vessels A to A3 as desired to maintain the required yeast concentration, control being provided by the valves indicated. To ensure that the flow of yeasty beer from the settling vessel B is the same as the beer inflow into this vessel, the top of separating vessel B is vented and connected by line 48a to the top of fermenting vessel A3. By way of pipe line 50 and the connecting lines 51, 52 and 53 connecting between pipe line 50 and the fermenting vessels A1, A2 and A3, respectively, wort of the other kind may be passed from a separate wort storage vessel to any of these fermenting vessels. The beer from the yeast separator B is passed by way of the line 54 through line 55 to a second yeast separating vessel B2 and from which it is passed by way of the pipe line 56 to other treatment zones as may be desired and referred to in connection with FIG. 1. The yeast from vessel B2 may be discharged via pipeline 57 to excess yeast collection. It will be noted that yeast taken from the bottom of yeast separating vessel B, when not required for maintaining the correct yeast in suspension in the fermenting vessels is pumped through line 49 to line 58, which connects with pipe line 55 where it mixes with beer from the beer outlet of separating vessel B, the complete flow going through line 55 into the continuous yeast separator B2. It is, of course, apparent from the illustration of this system and the various valve controls provided therein that a varied combination of treatments may be employed selectively as desired so that the rapidly fermenting beer may be subjected to variations in treatment throughout the cycling.

It is apparent from the foregoing that the continuous fermentation system may be carried out in a number of ways to suit requirements as by varying the number of zones, the manner of adding wort and the yeasting thereof. It will be obvious, therefore, that the essential steps to achieve desired results embody the continuous introduction of wort to the first zone of a system incorporating a series of interconnecting treatment zones, through which it passes, permitting rapid fermentation thereof by maintaining a high yeast concentration, maintaining a high temperature, maintaining yeast in suspension in the fermenting wort by continuous agitation, and finally separating out yeast followed by continuously drawing off the substantially clarified fermented wort from the last zone of the system at the same rate as the rate of introduction of the wort to the first of said zones.

What I claim as my invention is:

1. In a method for the production of a potable beer by the continuous fermenting and maturing of brewery wort in a continuous fermentation and maturing system, the steps of maintaining a first fermenting zone and a second fermenting zone; maintaining in each fermenting zone a body of continuously fermenting wort containing yeast i suspension; adding brewery wort to said first zone; substantially homogeneously dispersing the added wort throughout the body within said first zone as to maintain continuously therein a substantially high concentration of yeast growth materials whereby conditions favorable to yeast propagation are maintained throughout said body in the first zone; passing propagating yeast-bearing effluent from said first zone to said second zone; and substantially homogeneously dispersing said propagating yeast-bearing effluent throughout the body within said second zone as to maintain said second zone body at a substantially high yeast concentration favorable to rapid fermentation and maintaining substantially high concentration of products of fermentation including alcohol in said body of said second zone, whereby conditions favorable to accelerated maturing are sustained; and withdrawing fermented and matured yeast-bearing effluent from the second zone and separating yeast therefrom.

2. The method according to claim 1 wherein the addition of brewery wort to said first zone is substantially continuous.

3. The method according to claim 1 wherein the addition of brewery wort to said first zone is intermittent.

4. The method according to claim 1 including the further step of returning a portion of the separated yeast to said first zone, and substantially homogeneously dispersing it throughout said first zone.

5. The method according to claim 1 including the further step of returning a portion of the separated yeast to said second zone, and substantially homogeneously dispersing it throughout said second zone.

6. A method according to claim 1 wherein said second zone consists of a plurality of series-connected vessels and said body of fermenting wort contained therein is maintained at a substantially high concentration of yeast and at a substantially high concentration of products of fermentation, including alcohol, said fermented and matured yeast-bearing effluent being withdrawn from the last vessel of said series.

7. The method according to claim 1 in which the yeast concentration in said system is maintained at a value above 12 grams and up to 100 grams with a moisture content of 80% for each litre of fermenting wort.

8. The method according to claim 1 in which the temperature of each body of fermenting wort is maintained at a value above 480° F. and below the thermal death point of the yeast.

9. The method according to claim 1 in which the temperature of said first zone is higher than that of said second zone.

10. The method according to claim 1 in which the temperature of each body of fermenting wort is maintained at a value within the range of from 60° F. to 80° F. inclusive.

11. The method according to claim 1 including the further step of adding fermenting wort from the system beyond the first zone to the brewery wort being fed to the first zone.

12. The method according to claim 6 in which a wort diluent is added to said yeast-bearing effluent passing through the system beyond the first zone.

13. The method according to claim 12 in which the diluent is a prepared wort different in character to that added to the first zone.

14. The method according to claim 1, in which the wort added to said first zone is prepared at a specific gravity in excess of that required for making the finished potable beer, and the desired final specific gravity and alcoholic content of the potable beer are secured by dilution of the fermenting wort beyond the first zone.

15. The method according to claim 14 in which dilution takes place after the fermentation of the previously added wort is substantially completed.

16. The method according to claim 13 in which the flow of wort to the first zone contains malt extract and a strong hop flavor and the wort diluent is a sugary wort containing a delicate hop flavor, whereby loss of the delicate hop flavor is at least substantially reduced.

17. In a method for the production of a potable beer by the continuous fermenting and maturing of brewery wort in a continuous fermentation and maturing system, the steps of maintaining a fermenting and maturing zone; maintaining in said fermenting and maturing zone a body of continuously fermenting and maturing wort containing a high concentration of yeast in suspension, continuously adding to said body of continuously fermenting and maturing wort a brewery wort which has a specific gravity of up to six times that required for making the finished potable beer; maintaining by agitation substantially immediate homogeneity as between the added wort and said body of fermenting wort; withdrawing yeast-bearing effluent from said fermenting and maturing zone; separating yeast therefrom and diluting the yeast-depleted fermenting wort to provide the required specific gravity and alcoholic content in the potable beer product.

18. A method according to claim 17 in which a portion of the separated yeast is returned to said fermenting and maturing zone to maintain the yeast concentration therein at an artifically high value.

19. A method for the production of a potable beverage by the continuous fermentation of a yeast fermentable substrate to produce a potable fermented beverage, said method comprising; maintaining, in separate vessels, separate yeast propagation and product formation process stages; maintaining conditions favorable to yeast propagation in the yeast propagating stage; maintaining conditions favorable for alcohol production in the product formation stage; continuously introducing fermentable substrate to the yeast propagating stage, continuously passing effluent consisting of progagated yeast suspended in substrate from the yeast propagation stage to the product formation stage; separating yeast from effluent of the product formation stage and maintaining the yeast concentration in the product formation stage at an artificially high level.

20. A method for the production of a potable beverage by the continuous fermentation of a yeast fermentable substrate to produce a potable fermented beverage, said method comprising; maintaining, in separate vessels, separate yeast propagation and product formation process stages; maintaining aerobic conditions, favorable to yeast propagation in the yeast propagating stage; maintaining substantially anaerobic conditions favorable for alcohol production in the product formation stage; continuously introducing fermentable substrate to the yeast propagating stage, continuously passing effluent consisting of propagated yeast suspended in substrate from the yeast propagation stage to the product formation stage; separating yeast from effluent of the product formation stage and maintaining the yeast concentration in the product formation stage at an artificially high level.

21. The method of claim 20 wherein a controlled amount of fresh substrate is added to the product formation stage in addition to that contained in the effluent from the yeast propagation stage.

22. The method of claim 20 wherein the product formation stage comprises a plurality of sub-stages maintained in separate series-connected fermentation vessels.

23. A method for the production of potable beer by the continuous fermentation of brewer's wort, said method comprising; maintaining in separate vessels, separate yeast propagation and product formation process stages; maintaining aerobic conditions favorable to yeast propagation in the yeast propagating stage; maintaining substantially anaerobic conditions favorable for alcohol production in the product formation stage; continuously introducing brewer's wort to the yeast propagating stage, continuously passing effluent from the yeast propagation stage to the product formation stage; separating yeast from effluent of the product formation stage and maintaining the yeast concentration in the product formation stage at an artifically high level.

24. A method for the continuous fermentation of brewer's wort to produce a potable beer, said method comprising; maintaining in separate vessels, separate yeast propagation and product formation process stages; maintaining aerobic conditions, and a predetermined temperature of from 48° F. to a temperature below 110° F. in the yeast propagating stage; maintaining substantially anaerobic conditions and a predetermined temperature of from 48° F. to a temperature below 110° F. in the product formation stage; continuously introducing brewer's wort to the yeast propagating stage and maintaining yeast propagation therein, continuously passing effluent from the yeast propagation stage to the product formation stage; separating yeast from effluent of the product formation stage and maintaining the yeast concentration in the product formation stage at an artificially high level.

25. A method as defined in claim 24 wherein the temperature in the yeast propagation stage is maintained above that in the product formation stage.

26. A method as defined in claim 24 wherein the temperature in both stages of the process is maintained at a predetermined value within the range of from about 60° F. to about 80° F.

27. A process for the production of potable beer which comprises agitating a body of brewers wort and brewers yeast out of contact with air for dispersion of said yeast through said wort to promote rapid fermentation of said wort, keeping the temperature of said body of wort and yeast constant, adding a stream of unfermented wort to said body of wort and simultaneously drawing off a stream of fermented wort and yeast from said agitated body of wort and yeast into a yeast separating zone wherein the yeast flocculates and settles, drawing off fermented wort from said yeast separating zone, and permitting yeast to flow back by gravity from said separating zone into said agitated body of wort and yeast.

28. The method of claim 19, wherein said high yeast level in the product formation stage is maintained by re-introducing a portion of the separated yeast to the product formation stage.

29. The method of claim 19, wherein the yeast level in the product formation stage is maintained above 12 and up to 100 grams for each liter of fermenting wort.

30. A method as claimed in claim 1, wherein a stream of fermentable wort substrate is flowed towards said first fermenting zone, a portion of said flowing stream is diverted into said second fermenting zone and the remainder of said stream flows into said first fermenting zone.

31. A method for the production of a potable beverage by the continuous fermentation of a yeast fermentable substrate, comprising continuously introducing yeast fermentable substrate into a system including a fermenting zone and a yeast separating zone, passing said substrate through said system, maintaining in the fermenting zone a concentration of yeast in suspension in said substrate at an artificially high level and a temperature between 48° F. and the thermal death point of said yeast to promote rapid fermentation of said substrate in said fermenting zone, separating yeast from the fermenting substrate passing through said yeast separating zone and continuously drawing off fermenting substrate from said yeast separating zone.

References Cited by the Examiner

UNITED STATES PATENTS 2,188,192    1/1940    Scholler et al. _____ 195—94

OTHER REFERENCES

Bilford et al.: "Alcoholic Fermentation of Molassess," Ind. and Eng. Chem., vol. 34, No. 11, November 1942, pp. 1406–1410.

De Beeze et al.: "Continuous Fermentation," American Brewer, February 1943, pp. 11–16, 30, 32, 34.

A. LOUIS MONACELL, *Primary Examiner.*

TOBIAS E. LEVOW, ABRAHAM H. WINKELSTEIN,
*Examiners.*

M. W. GREENTEIN, *Assistant Examiner.*

UNITED STATES PATENT OFFICE
CERTIFICATE OF CORRECTION

Patent No. 3,234,026                                                    February 8, 1966

Morton William Coutts

It is hereby certified that error appears in the above numbered patent requiring correction and that the said Letters Patent should read as corrected below.

Column 3, line 41, for "wall" read -- well --; column 5, line 31, for "vessel 1" read -- vessel A1 --; column 6, line 63, for "surgary" read -- sugary --; column 7, line 65, for "i" read -- in --; column 8, line 36, for "480° F." read -- 48° F. --.

Signed and sealed this 3rd day of January 1967.

(SEAL)
Attest:

ERNEST W. SWIDER                                          EDWARD J. BRENNER
Attesting Officer                                                    Commissioner of Patents